United States Patent [19]

Vaillette et al.

[11] 3,965,765
[45] June 29, 1976

[54] PULLEY

[75] Inventors: Bernard D. Vaillette, Leominster; William E. Zastawny, South Grafton, Mass.

[73] Assignee: Cincinnati Milacron-Heald Corporation, Worcester, Mass.

[22] Filed: Mar. 17, 1975

[21] Appl. No.: 558,630

[52] U.S. Cl. .................... 74/230.5; 74/240; 74/241
[51] Int. Cl.² ................ F16H 55/36; F16H 7/18
[58] Field of Search .................. 74/240, 241, 230.5

[56] References Cited
UNITED STATES PATENTS
3,122,935  3/1964  Morling .................. 74/241

Primary Examiner—Leonard N. Gerin
Attorney, Agent, or Firm—Norman S. Blodgett; Gerry A. Blodgett

[57] ABSTRACT

A pulley whose outer surface is in the form of three tapered portions selected for use with a flat belt.

9 Claims, 3 Drawing Figures

PULLEY

BACKGROUND OF THE INVENTION

Despite the advent of V-type belt drives and the like, it is still common practice to use large flat belts for driving spindles in machine tools, such as the wheelhead of a grinding machine. This is because the flat belt provides the maximum area of contact between the belt and the spindle and thin flat belts can operate at much higher surface speeds than V-belts. However, the conventional crowned pulley provides some disadvantages when used with a flat belt. While the belt is dry it operates well with the pulley, but there are occasions when the belt becomes saturated with fluid, as is sometimes the case when mist lubrication is used in a machine tool or oil is used as a grinding coolant. Under such conditions it is often found that the belt slips off the end of the pulley and renders the machine tool inoperative. While it is not a difficult matter to remove the shield from the machine and replace the belt, nevertheless, an expensive machine is not productively occupied during this "down-time" and this is economically unsound since a piece of valuable capital equipment is not being used effectively. These and other difficulties experienced with the prior art devices have been obviated in a novel manner by the present invention.

It is, therefore, an outstanding object of the invention to provide a pulley constructed so that a flat belt will remain on the pulley irrespective of whether the belt is wet or dry.

Another object of this invention is the provision of a pulley whose surface is of such a conformation that it has a portion of its surface particularly adapted for use with a dry flat belt and another portion particularly adapted for use when the belt is wet.

A further object of the present invention is the provision of a pulley which will not release a flat belt even when the belt is covered with lubricant.

It is another object of the instant invention to provide a pulley which is simple in construction, inexpensive to manufacture, and which is capable of a long life of useful service under varying conditions with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of a pulley for driving a spindle in conjunction with a flat belt. The pulley has a first portion with a surface of revolution that tapers from a large end to a small end. It has a second portion with a surface of revolution having a large end and a small end with the large end being located adjacent the large end of the first portion. The pulley is provided with a third portion with a surface of revolution which has a large end and a small end, the small end being located adjacent the small end of the second portion. A taper of the third portion is substantially greater than the taper of the second portion.

More specifically, in one embodiment of the invention the surfaces of all three persons are conical, and the angle between a generatrix of the first portion in the access is four degrees, that of the second portion is one degree, and that of the third portion is four degrees. In another embodiment of the invention, the surfaces of all three portions are composed of circular segments; the surface of the first portion being convex, the surface of the third portion being concave, and the surface of the second portion being convex adjacent the first portion and concave adjacent the third portion.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
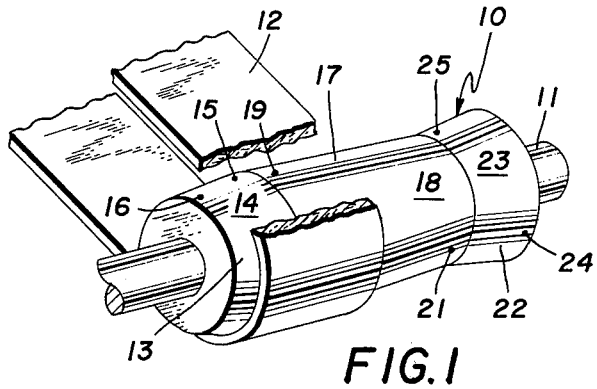
FIG. 1 is a perspective view of a pulley embodying the principles of the present invention.
Figure 2:
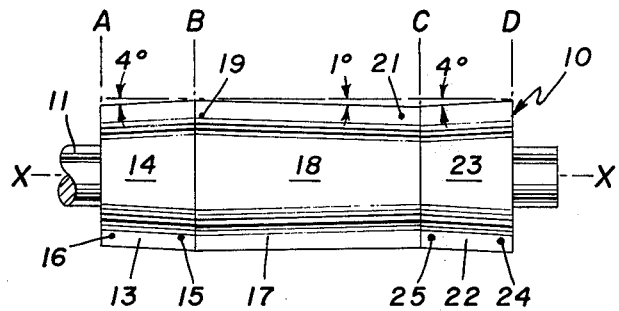
FIG. 2 is a side elevational view of the pulley.

Referring first to FIGS. 1 and 2, wherein are best shown the general features of the invention, the pulley indicated generally by the reference numeral 10, is shown mounted on a shaft 11 which may, for instance, be the spindle of a grinding wheelhead and driven by a flat belt 12. The pulley has a first portion 13 which extends from the line A to the line B (in FIG. 2), which has a tapered surface of revolution 14 and a large end 15 and a small end 16. The small end is at the extreme end of the pulley.

The pulley is also provided with a second portion 17 extending from the line B to the line C and having a tapered surface of revolution 18. The second portion has a small end 21 and a large end 19, the large end being adjacent and joined to the large end 15 of the first portion 13.

The pulley also has a third portion 22 having a tapered surface of revolution 23. The third portion has a large end 24 and a small end 25, the small end being adjacent to and connected to the small end of the second portion. The second portion 17 extends axially approximately twice the distance of either the first portion 13 or the third portion 22. The taper of the first and third portions is substantially greater than the taper of the second portion.

The surfaces of all three portions are conical. The angle between a generatrix of the surface 14 of the first portion lies at an angle of 4° to the axis of the pulley and the spindle, the angle of the second portion is one degree, and that of the third portion is 4°. The intersections of the three conical surfaces are suitably rounded.

The operation of the invention will now be readily understood in view of the above description. With the belt 12 driven by a motor (not shown), the belt friction causes the pulley 10 to rotate and therefore rotate the spindle 11. If the belt is dry it seeks the highest point on the pulley and therefore sits astride the intersection between the first portion and the second portion. Because of the difference in angularlity in the two portions, the belt will extend over the second portion considerably a greater distance then over the first portion. If the belt becomes lubricated by mist lubrication, oil, or even water, the friction will be reduced and the belt will slide down the second portion and reside in the valley between the second portion and the third portion. Here again, because of the steep angle of the third portion the belt will extend axially over a much greater portion of the second portion than it does over the third portion. This means, therefore, that when the belt is wet with lubricant, it will still remain on the pulley and perform its function in driving the spindle but, of course, with less transmission of power, because the oil decreases the coefficient of friction.

Figure 3:
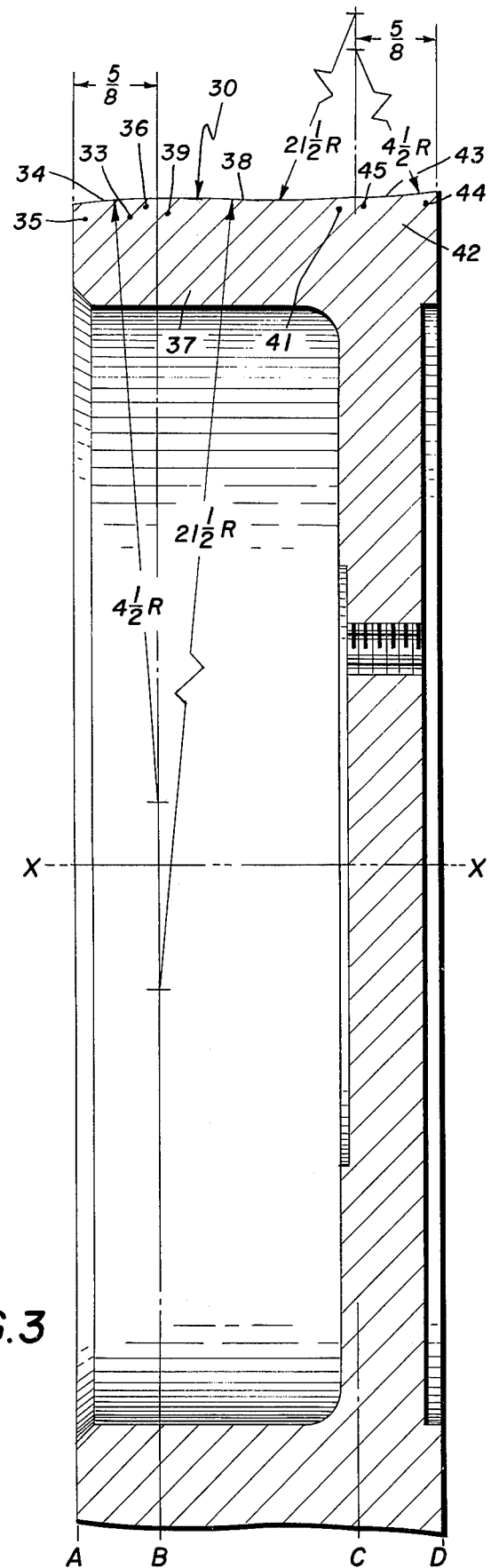
FIG. 3 is a vertical sectional view through a modified form of the pulley.

Referring now to FIG. 3, which shows a modified form of the invention, the pulley, indicated generally by the reference numeral 30, is shown as having a first portion 33 which extends between the line A and the line B. This portion has a surface of revoluton 34 which is curved from a large end 35 to a small end 36. The pulley has a second portion 37 which extends from the line B to the line C. This second portion has a surface of revolution 38 which is curved from a large end 39 (adjacent the large end 35 of the first portion) to a small end 41. This pulley 30 is also provided with a third portion 42 having a surface of revolution 43 which curves from a large end 44 to a small end 45 adjacent the small end 41 of the second portion.

The surfaces 34, 38 and 43 of the three portions 33, 37, and 42 are all circular segments, the surface 43 of the third portion 42 being concave and the surface 34 of the first portion 33 being convex. The surface of the second portion 37 is convex adjacent the first portion and concave adjacent the third portion, the adjacent concave and convex surfaces being tangential to one another. As is evident in the drawings, the generatrix of the surface 38 of the second portion 37 is in the form of an ogee to provide a smooth transition between the convex portion and the concave portion.

The radii of curvature of the two circles making up the generatrix of the ogee are the same. The radii of the curvature of the first and third portion generatrices are the same and are substantially smaller than the radii of curvature of the circles making up the ogee. The surface 38 of the second portion 37 extends axially approximately twice the distance of either of the generatrices of the first or third portions, as is evident in the drawing. FIG. 3 shows the dimensions of a typical pulley of this type, the first portion 33 extending for 5/8 of an inch, the second portion extending for 1½ inches, and the third portion 42 extending for 5/8 of an inch. The radii of the circles making up the generatrix of the second portion are 21½ inches and have their centers located on the planes B and C of the transition point between the first and second portions on the one hand and the second and third portions on the other hand. The radius of the generatrix of the surface 34 of the first portion is 4½ inches, while that of the generatrix of the third portion is also 4½ inches.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A pulley for driving a spindle in conjunction with a flat belt, comprising
    a. a first portion having a surface of revolution that tapers from a large end to a small end,
    b. a second portion having a surface of revolution having a large end and a small end, the large end being located adjacent the large end of the first portion, and
    c. a third portion having a surface of revolution having a large end and a small end, the small end being located adjacent the small end of the second portion, the surfaces of all three portions being composed of circular segments, the surface of the first portion being convex, the surface of the third portion being concave, and the surface of the second portion being convex adjacent the first portion and concave adjacent the third portion.

2. A pulley as recited in claim 1, wherein the adjacent convex surfaces are tangential to one another.

3. A pulley as recited in claim 2, wherein the surface of the second portion has a generatrix in the form of an ogee, the radii of curvature of the two circles making up the ogee being the same, the radii of curvature of the first and the third portions being the same and being substantially smaller than the radii of curvature of the ogee circles.

4. A pulley for driving a spindle in conjunction with a flat belt, comprising
    a. a first portion having a surface of revolution that tapers from a large end to a small end,
    b. a second portion having a surface of revolution having a large end and a small end, the large end being located adjacent the large end of the first portion, and
    c. a third portion having a surface of revolution having a large end and a small end, the small end being located adjacent the small end of the second portion, the second portion extending axially approximately twice the distance of either the first or third portions.

5. A pulley as recited in claim 4, wherein the taper of the third portion is substantially greater than the taper of the second portion.

6. A pulley as recited in claim 4, wherein the surfaces of all three portions are conical, wherein the angle between a generatrix of the first portion and the axis is 4°, that of the second portion is 1°, and that of the third portion is 4°.

7. A pulley as recited in claim 4, wherein the surfaces of all three portions are composed of circular segments, the surface of the first portion being convex, the surface of the third portion being concave, and the surface of the second portion being convex adjacent the first portion and concave adjacent the third portion.

8. A pulley as recited in claim 7, wherein the adjacent convex surfaces being tangential to one another.

9. A pulley as recited in claim 8, wherein the surface of the second portion has a generatrix in the form of an ogee, the radii of curvature of the two circles making up the ogee being the same, the radii of curvature of the first and the third portions being the same and being substantially smaller than the radii of curvature of the ogee circles.

* * * * *